C. Tyler,
Sawing Shingles,
N°900, Patented Aug. 30, 1838.
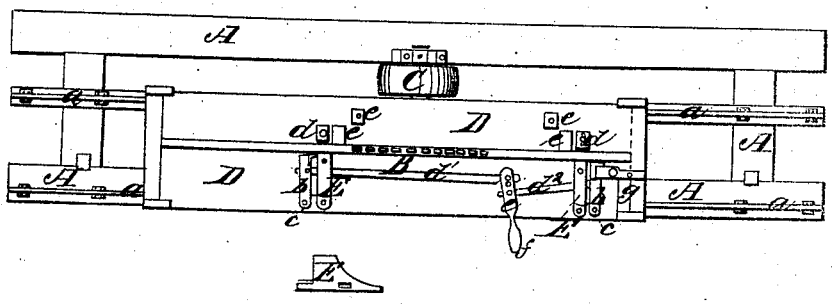

UNITED STATES PATENT OFFICE.

CRAWFORD TYLER, OF MILFORD, NEW HAMPSHIRE.

MACHINE FOR SAWING CLAPBOARDS, APPLICABLE TO OTHER PURPOSES.

Specification of Letters Patent No. 900, dated August 30, 1838.

*To all whom it may concern:*

Be it known that I, CRAWFORD TYLER, of Milford, in the county of Hillsborough and State of New Hampshire, have invented an Improved Machine for the Purpose of Sawing Clapboards and other Similar Kinds of Stuff; and I do hereby declare that the following is a full and exact description thereof.

In the accompanying drawing, A, A, is the bench or frame upon which the carriage is to be sustained, $a$, $a$, being ways of cast iron, or other metal to which wheels, or rollers, on the under side of the carriage are adapted, in the usual manner of constructing and affixing such wheels. Upon a shaft running in suitable boxes on the frame A, A, is fixed a circular saw B, which may be driven by a band on the whirl C. The bolts, or stuff to be cut into clapboards is sustained upon the carriage D, D. This stuff must be cut into suitable lengths, to be embraced by the holdfasts, or dogs to be presently described.

E, E, are two stanchions, or curved head blocks, shown laterally at E', upon which the quartered timber is to be placed, its rounding sides resting in the hollow of the blocks, and its lower edge bearing against the stops $d$, $d$, which may be adjusted by means of set screws. The two dogs are marked $b$, $b$; these turn upon joint pins, $c$, $c$, at their outer ends, and at their inner have a hook, or claw which takes hold of the bolt. Two connecting rods $d^1$, $d^2$, are attached to the two dogs, respectively, at one of their ends, by joint pins and at their other ends to the lever $e$, in a similar manner. This lever works on a center pin, being moved by the handle $f$, which, as will be readily seen from the drawing, moved forward, closes the dogs and backward, opens them.

The operation of this machine will be apparent from the description above given, when the bolt is placed upon the curved blocks, the dogs being open, its lower edge will at once slide down against the stops, and upon forcing the handle $f$, forward the bolt will be kept in its place by the dogs and the carriage will be made to advance until a clapboard is sawed off. The piece $g$, is a handle upon the carriage which is to be holden by the right hand, while the left manages the handle $f$, when this is drawn back, the dogs will open and the bolt, set at liberty, will again slide against the stop and rest in the proper place for a new cut; when necessary it may be adjusted by hand. The bolt is placed on the 4 small wooden blocks $e$, $e$, $e$, $e$, for the purpose of sawing off the angular edge of the heart of the bolt.

What I claim as my invention in the above described machine is—

The manner in which the dogs are constructed and operated, as herein described, in combination with the stanchions, or curved head blocks, stops, and four small wooden blocks; the other part of this machine I do not claim.

CRAWFORD TYLER.

Witnesses:
MARY LIVERMORE,
L. K. LIVERMORE.